Figure 1:
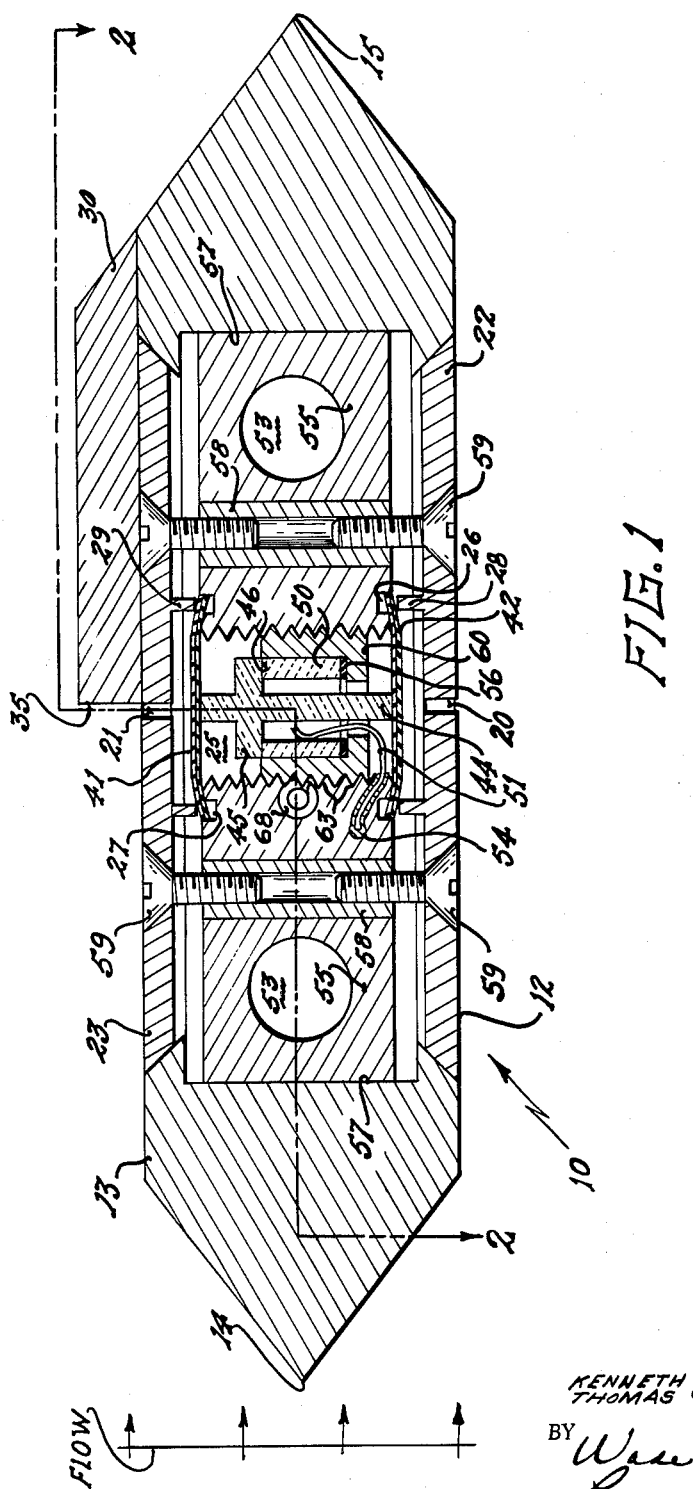

INVENTOR.
KENNETH KAPLAN,
THOMAS C. GOODALE
BY
ATTORNEYS

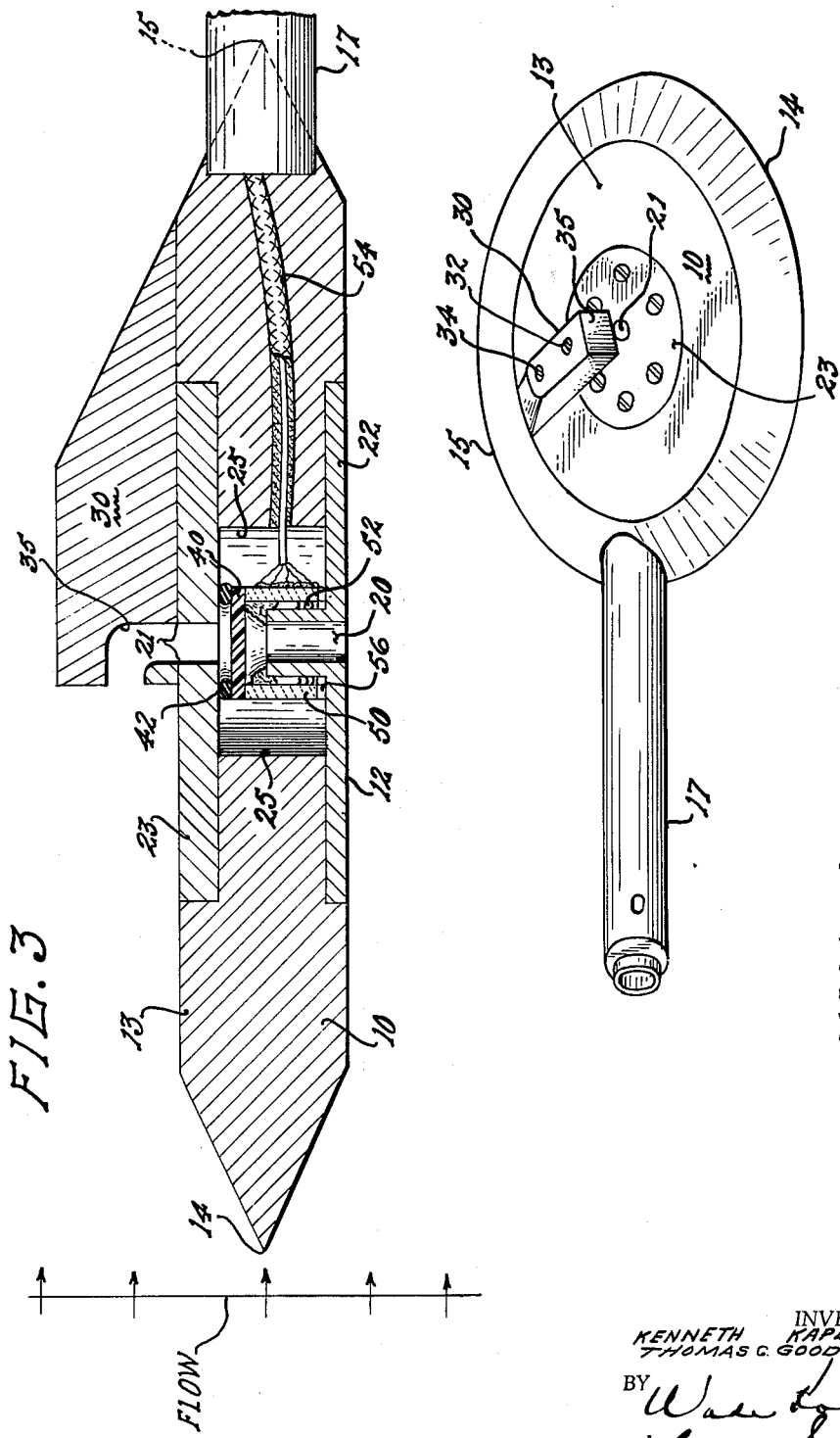

2,245,264
MINIATURE DYNAMIC PRESSURE GAUGE
Kenneth Kaplan and Thomas Goodale, San Mateo, Calif., assignors to the United States of America as represented by the Secretary of the Air Force
Filed June 18, 1963, Ser. No. 288,843
14 Claims. (Cl. 73—398)

This invention relates generally to pressure gauges, and particularly, to miniature gauges suitable for the measurement of dynamic pressure in shock duration shock flows.

Shock waves, in a fluid such as air, are characterized by a pressure behind the shock front known as shock overpressure greater than ambient pressure, and by a movement of air particles behind the shock front. A measure of the pressure that the air particle movement behind the shock front can cause on an object in the flow is the dynamic pressure defined as one-half the product of air density and the square of the air particle velocity. However, dynamic pressure is rarely, if ever, determined by direct measurements of density and velocity. It is far more practical to measure the difference between stagnation, or zero velocity, pressure and incident or side-on, overpressure, since that difference has been found to approximate dynamic pressure.

At relatively low pressure levels the difference between stagnation and side-on pressures is fairly small relative to either pressure, and thus, it is quite apparent that even small errors in the independent measurement for either pressure can result in a large error with respect to the dynamic pressure. Measurement errors may be avoided by dispensing with independent measurement of stagnation and side-on pressures and allowing the two pressures to interact in a fashion producing a differential pressure which is effective at a single pressure sensor.

Naturally, both pressures must be sensed at separate points, each free from influences of the other. In addition, the time of shock travel from one sensing point to the other must be small in comparison to total shock duration, otherwise, significantly different flow conditions will be sensed at each point. The invented gauge herein surmounts these difficulties by simultaneously sensing both pressures in a shock flow which has been divided into separate streams, each free from influence of the other. Furthermore, it may be required that the gauge withstand extreme temperatures, for example, in measurements or rocket engine blast.

Therefore, it is an object of this invention to provide a gauge for indications of dynamic pressure in a fluid flow environment.

It is an object of this invention to indicate dynamic pressure by measuring a differential of stagnation and side-on pressures in a fluid flow.

Another object is the provision of a dynamic pressure gauge which simultaneously senses both stagnation and side-on pressure, each at a separate station, free from influence of the other.

An object of the invention is the provision of a gauge which may be easily balanced and calibrated to accurately indicate dynamic pressure.

Yet another object is the provision of a miniature dynamic pressure gauge which is able to withstand extreme temperatures.

It is still another object of the invention to provide a dynamic pressure gauge which is economical to produce and which utilizes conventional, currently available materials that lend themselves to standard mass production manufacturing techniques.

Figure 2:
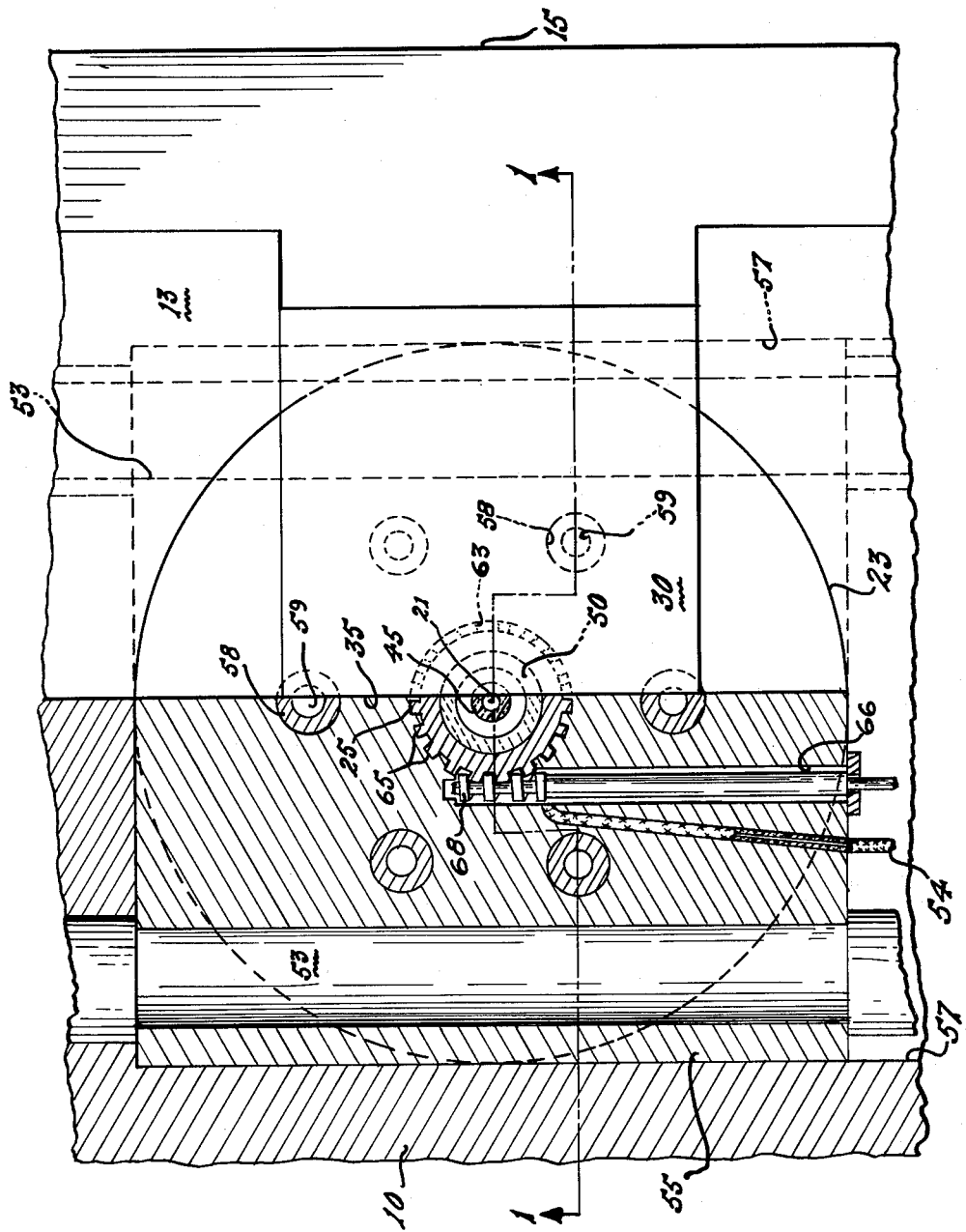

These and other advantages, features and objects of the invention will become more apparent from the following description taken in connection with the illustrative embodiments in the accompanying drawings, wherein:

FIGURE 1 is a schematic cross-section of a preferred embodiment of the invented gauge;
FIGURE 2 is a schematic plan view, partially in section, of FIGURE 1;
FIGURE 3 is a schematic cross-section of an alternate, more basic embodiment; and
FIGURE 4 is a perspective view of an alternate configuration of the invention.

With reference to the drawings, a flow divider 10 is suitably fashioned of a durable material, preferably metallic, to have flat opposite sides 12 and 13 that streamline to a leading edge 14 and a trailing edge 15. It is desirable that a division of shock flow into separate streams be accomplished with minimal disturbance of flow conditions. Thus, it is necessary that flow divider 10 be relatively narrow, and that sides 12, 13 and edges 14, 15 be aligned, as illustrated, to parallel the shock flow direction (indicated in the figures by arrows). The flow divider 10 may be a blade-like configuration extending into the flow, or any other suitably supported appropriate configuration, for example, in FIGURE 4, the discus shape supported in the flow by rod 17.

Pressure ports 20 and 21 are provided in flat sides 12 and 13, through the removable cover plates 22, 23, at opposed stations which are in a line normal to flow direction so that passing shock waves arrive at each port simultaneously. As shown, both ports open normal to the flow directions and lead to a transverse cylindrical opening 25 through the flow divider.

A baffle plate 30 is affixed on one side of the flow divider by a detachable means such as machine screws 32 and 34 (FIGURE 4). Baffle 30 has a position adjacent and downstream to one of the pressure ports. In this manner, a stagnation pressure is created by the flow obstruction of perpendicular face 35, which, as shown, is tangent to a trailing point of port 21. Clearly, the long distance around the flow divider minimizes the influences of baffle 30 upon the side-on pressure at port 20, although the physical separation between the ports is small.

Septum means are provided to yield a differential of the side-on and stagnation pressures at ports 20 and 21, respectively. Operation principals of the septum means will first be explained with reference to FIGURE 3. In the embodiment of FIGURE 3, the port 20 is encompassed by a piezoelectric tube 50, which in turn is capped at one end by a septum disk 40 to effectively separate the pressures at each port. Since the pressures act on opposite sides of septum disk 40, their differential will cause a resultant force to be transmitted to the piezoelectric sensor 50. The area of septum disk 40 exposed to stagnation pressure may be limited by the sealing ring 42 provided between the disk 40 and cover plate 23. Due to piezoelectric properties of sensor 50, an electrical potential, proportional to the resultant force, will be generated between the inner and outer peripheries of tube 50. As illustrated, a good electrical contact between cover plate 22 and the inner periphery of tube 50, in this instance, a silver conducting paint at 52, will provide a ground connection. An insulated and shielded wire lead 54 is suitably connected to the outer periphery of tube 50, as shown. The insulator disk 56 prevents a short circuit across the cover plate 22.

The embodiment shown in FIGURES 1 and 2 is suitable for use in extreme temperature environments. A removable gauge block 55, with coolant openings at 53, is positioned within the longitudinal slot 57 provided in the flow divider 10. A coolant source (not shown) is circulated through appropriate conduits to the coolant openings 53 for the purpose of limiting the rate of heat rise in the block 55. As shown, the flat sides 12 and 13 are counter sunk to slot 57 and receive the beveled cover plates 22, 23 as flush continuations. The removable block and cover plates are all held together in place by engagement between the machine screws 59 and the threaded sleeves 58 in block 55. The opening 25 is internally threaded and provided with a surrounding groove 26, 27 at each end.

Septum means, separating the pressures to yield a differential thereof, are provided by the metallic septum diaphragms 41 and 42, together with the rod 44 therebetween. A circular ridge 28 and 29, at each cover plate forces the outside edges of the diaphragms into grooves 26, 27, respectively, and effectively encloses the opening 25. Rod 44 is of a thermal insulating material such as glass, and has a disk-like radial extension 45 bearing at surface 46 upon one end of the piezoelectric tube 50, which in turn, is securely seated within mounting cup 60. The piezoelectric sensor 50 is isolated from direct exposure to extreme temperature flow by diaphragms 41, 42 which conduct the heat to gauge block 55. The diaphragms, themselves are somewhat protected by cover plates 22, 23 and minimal heat is transferred through the glass rod 44. Mounting cup 60 is open at both ends to allow the extension therethrough of rod 44. The cup 60 has external threads at 63 for engagement within the internally threaded opening 25. As indicated in FIGURE 2, the threads 63 have transverse slots providing square gear teeth 65. A bore 66 tangent to opening 25 is provided through block 55, as shown. A worm gear 68 within bore 66 engages square teeth 65 to revolve and move cup 60 along the threaded opening 25. A differential of the pressures sensed at each diaphragm is transmitted through rod 44 to the piezoelectric tube 50, which generates a proportional electrical voltage thereof. In this embodiment, a ground connection is provided from the outside periphery of tube 50 through the metal mounting cup 60. The insulated and shielded wire lead 54 connects through slide contact 51 to the inner periphery of tube 50. Short circuiting through cup 60 is prevented by insulator ring 56.

For gauge operation, the electrical potentials generated by piezoelectric sensor 50 are applied to an amplifier and visual indicator such as a meter or scope (not shown). Conventional mechanical and electronic filtering may be utilized to reduce noise level, for example, by covering the ports with cloth and by using available low band pass electronic filters. Instrument balance may be accomplished by removing the stagnation baffle 30 and allowing side-on pressure to act at both ports. At these conditions the opposing pressures are equal and no signal should be generated. Balance is accomplished in the basic embodiment of FIGURE 3 by substituting the proper size sealing ring 42. An alternate, easier method of balancing is provided by the embodiment of FIGURES 1 and 2. Worm gear 62 is turned to adjust the position of sensor 50 so that equal opposed pressures are transmitted at each diaphragm to the rod 44. Rankine-Hugoniot relationships relating dynamic pressure to ambient pressure, side-on pressure, flow Mach number, and stagnation pressure may be used to calculate dynamic pressure values and applied to the instrument response for an accurate calibration thereof.

Although the invention has been described with reference to particular embodiments, it will be understood to those skilled in the art that the invention is capable of a variety of alternative embodiments within the spirit and scope of the appended claims.

We claim:

1. A miniature gauge for indicating dynamic pressure in a fluid flow environment, comprising: a flow divider aligned with said flow having opposed pressure ports normal thereto; a baffle affixed on said divider adjacent one of said ports to create a stagnation pressure thereat; means within said divider responding to pressures at both said ports by yielding a differential pressure thereof; and a sensing means stimulated by said differential pressure to transmit an electrical indication thereof.

2. A miniature gauge for indicating dynamic pressure in a fluid flow environment, comprising: a flat and narrow flow divider aligned with said flow and having a transverse opening therethrough including opposed pressure ports normal to said flow; a baffle affixed on said divider adjacent one of said ports to create a stagnation pressure thereat; a septum means within said opening for separating pressures at said ports and yielding a differential pressure thereof; and a sensing means stimulated by said differential pressure to transmit an electrical indication thereof.

3. A miniature gauge for indicating dynamic pressure in a fluid flow environment, comprising: a narrow streamlined flow divider having flat sides aligned with said flow and having a transverse opening therethrough including opposed pressure ports at said sides normal to said flow; a baffle plate affixed on one of said sides with a face obstructing said flow at a position adjacent one of said ports to create a stagnation pressure thereat; a septum means within said opening for separating pressures at said ports and yielding a differential pressure thereof; and a sensing means stimulated by said differential pressure to transmit an electrical indication thereof.

4. A miniature gauge for indicating dynamic pressure in a fluid flow environment, comprising: a narrow streamlined flow divider having leading and trailing edges and flat sides aligned with said flow and having a transverse opening therethrough including opposed pressure ports at said sides normal to said flow; a baffle plate affixed on one of said sides with a perpendicular face obstructing said flow at a trailing position adjacent one of said ports to create a stagnation pressure thereat; a septum means within said opening for separating pressures at said ports and yielding a differential pressure thereof; and a sensing means contacted by said septum means for stimulation by said differential pressure to transmit an electrical indication thereof.

5. A miniature gauge for indicating dynamic pressure in a fluid flow environment, comprising: a narrow streamlined flow divider having leading and trailing edges and flat sides aligned with said flow and having a transverse cylindrical opening therethrough including opposed pressure ports at said sides normal to said flow; a baffle plate affixed on one of said sides with a perpendicular face obstructing said flow at a trailing position adjacent one of said ports to create a stagnation pressure thereat; a septum disk across said opening separating pressures at said ports and conveying a differential pressure thereof; and a sensing means mounted within said opening for stimulation by said differential pressure to transmit an electrical indication thereof.

6. A miniature gauge for indicating dynamic pressure in a fluid flow environment, comprising: a narrow streamlined flow divider having leading and trailing edges and flat sides aligned with said flow and having a transverse cylindrical opening therethrough including opposed pressure ports at said sides normal to said flow; a baffle plate affixed on one of said sides with a perpendicular face obstructing said flow at a trailing position adjacent one of said ports to create a stagnation pressure thereat; a septum disk across said opening separating pressures at said ports and conveying a differential pressure thereof; and a sensing tube mounted within said opening for stimulation at an end of said tube by said differential pressure to transmit an electrical indication thereof.

7. A gauge in accordance with claim 6 in which said sensing tube has an end enveloping one of said ports and an opposite end capped by said septum disk.

8. The gauge of claim 7 in which a removable sealing ring is provided between said septum disk and remaining of said ports.

9. A miniature gauge for indicating dynamic pressure in a high temperature fluid flow environment, comprising: a narrow streamlined flow divider having leading and trailing edges and flat sides aligned with said flow and having a transverse cylindrical opening therethrough including opposed pressure ports at said sides normal to said flow; a baffle plate affixed on one of said sides with a perpendicular face obstructing said flow at a trailing position adjacent one of said ports to create a stagnation pressure thereat; a pair of septum diaphragms mounted across said opening at positions proximate said ports to separate pressures thereat; a sensing tube mounted within said opening and between said diaphragms; and a rod extending through said tube with ends bearing on said diaphragms and having a radial extension with a surface bearing on an end of said tube, said rod responding to pressures at said ports by conveying a differential pressure, stimulating said sensing means to transmit an electrical indication thereof.

10. A gauge in accordance with claim 9 in which said rod is of a material having high properties of thermal and electrical insulation.

11. The gauge of claim 10 in which coolant conduit circuits are provided through said flow divider and about said cylindrical opening.

12. The gauge of claim 11 in which said cylindrical opening has internal threads and said sensing tube is provided with an open mounting cup having external threads enmeshed with said internal threads to enable a position adjustment of said sensing tube by revolving said cup.

13. The gauge of claim 12 in which said external threads of said cup have been transversely slotted for engagement with a worm drive provided to extend without said divider to enable an external adjustment.

14. A miniature gauge for indicating dynamic pressure in a high temperature supersonic flow environment, comprising: a narrow streamlined flow divider having leading and trailing edges and flat sides aligned with said flow and having a longitudinal slot therein, said sides having opposed countersunk openings to said slot; a gauge block having a transverse threaded opening, positioned within said slot between said countersunk openings, said block including coolant openings therethrough and a bore tangent to said threaded opening; a pair of septum diaphragms enclosing said threaded opening; a pair of cover plates fitting said countersunk openings flush with said sides and affixed to said block, said plates including opposed pressure ports therethrough concentric with said diaphragms; a baffle plate affixed on one of said sides with a perpendicular face obstructing said flow at a trailing position tangent one of said ports to create a stagnation pressure thereat; an open mounting cup having external threads for engagement within said threaded opening and between said diaphragms, said threads having transverse slots; a worm gear within said tangent bore in engagement with said transverse slots to rotate said cup in said threaded opening enabling a position adjustment thereof; a sensing tube concentrically mounted in said cup; and a rod extending through said tube and cup with ends bearing on said diaphragms and having a radial extension with a surface bearing on an end of said tube, said rod responding to pressures at said ports by conveying a differential pressure stimulating said sensing tube to transmit an electrical indication thereof.

No references cited.

LOUIS R. PRINCE, *Primary Examiner.*

D. O. WOODIEL, *Assistant Examiner.*